United States Patent
Fisher et al.

(10) Patent No.: US 6,737,780 B1
(45) Date of Patent: May 18, 2004

(54) ELECTRIC MOTOR MAGNETIC FLUX PATH STRUCTURE

(75) Inventors: Bryan Todd Fisher, Appin (CA); Stan Simpson, St. Thomas (CA); Eric Bartlett, London (CA); Dumitru Plavosin, London (CA)

(73) Assignee: Siemens VDO Automotive Inc., Mississauga (CA)

( * ) Notice: Subject to any disclaimer, the term of this patent is extended or adjusted under 35 U.S.C. 154(b) by 0 days.

(21) Appl. No.: 10/657,656

(22) Filed: Sep. 8, 2003

Related U.S. Application Data
(60) Provisional application No. 60/446,899, filed on Feb. 12, 2003.

(51) Int. Cl.[7] .............................................. H02K 21/26
(52) U.S. Cl. ........................... 310/154.03; 310/154.14; 310/154.15; 310/256; 310/89
(58) Field of Search ........................ 310/154.01, 154.03, 310/154.08, 154.09, 154.12, 154.14, 154.15, 256, 89, 254, 51

(56) References Cited

U.S. PATENT DOCUMENTS

| | | | |
|---|---|---|---|
| 3,185,276 A | 5/1965 | Sajovac, Jr. ............... 192/86.81 |
| 3,185,899 A | 5/1965 | Skelton, Jr. ................. 335/209 |
| 3,244,917 A * | 4/1966 | Gute ..................... 310/154.08 |
| 3,349,880 A | 10/1967 | Baer ........................ 192/84.81 |
| 3,586,048 A | 6/1971 | Arnold ................... 137/614.04 |
| 3,657,582 A * | 4/1972 | Phelon ................... 310/156.31 |
| 3,934,690 A | 1/1976 | Janning ................... 192/84.81 |
| 3,974,902 A | 8/1976 | Wahlstedt et al. ....... 192/84.81 |
| 4,190,141 A | 2/1980 | Bennett et al. ........ 192/84.951 |
| 4,263,995 A | 4/1981 | Wahlstedt ................... 192/35 |
| 4,323,804 A * | 4/1982 | Zelt ............................ 310/72 |
| 4,337,855 A | 7/1982 | Bennett .................... 192/84.81 |
| 4,619,588 A * | 10/1986 | Moore, III ................... 417/366 |
| 4,630,722 A | 12/1986 | Figueira et al. .......... 192/84.81 |
| 4,866,324 A | 9/1989 | Yuzawa et al. ............. 310/268 |
| 4,968,911 A | 11/1990 | Denk .......................... 310/42 |
| 5,012,144 A | 4/1991 | Huitema et al. .............. 310/14 |
| 5,351,893 A | 10/1994 | Young ..................... 239/585.1 |
| 5,493,157 A | 2/1996 | Nakamura ................ 310/67 R |
| 5,687,822 A | 11/1997 | Arai ......................... 192/84.81 |
| 5,731,648 A | 3/1998 | Gaughan et al. ............ 310/216 |
| 5,833,440 A | 11/1998 | Berling ........................ 417/418 |
| 5,903,083 A * | 5/1999 | Mukai et al. ................ 310/263 |
| 6,060,799 A | 5/2000 | McManus et al. ............ 310/43 |
| 6,129,527 A | 10/2000 | Donahoe et al. ............ 417/416 |
| 6,137,203 A | 10/2000 | Jermakian et al. .......... 310/191 |
| 6,225,714 B1 * | 5/2001 | Agnon et al. .................. 310/51 |
| 6,236,123 B1 | 5/2001 | Pinkerton .................... 310/12 |
| 6,326,706 B1 | 12/2001 | Zhang .......................... 310/12 |
| 6,488,133 B1 | 12/2002 | Maurice et al. ............. 438/253 |
| 2002/0003077 A1 | 1/2002 | Moroi et al. ............. 192/84.81 |

OTHER PUBLICATIONS

I T De Villiers, "The Behavior Of Contractors During Voltage Dips", Dip–Proofing Technologies, Inc. Sep. 8, 2003.

* cited by examiner

Primary Examiner—Dang Le

(57) ABSTRACT

An electric motor 10 has an armature 12 including windings 14. The armature is constructed and arranged to rotate a shaft 16. The motor includes a commutator 18 and a brush card assembly 20 having brushes to engage the commutator and conduct electrical current to the windings. A permanent magnet structure 21 is disposed about the armature. A frame assembly 22 carries the permanent magnet structure. A coil spring structure 36, containing iron, is disposed about and contacts the permanent magnet structure to define a flux path of the motor.

17 Claims, 4 Drawing Sheets

ELECTRIC MOTOR MAGNETIC FLUX
PATH STRUCTURE

This application is based on U.S. Provisional Application No. 60/446,899 filed on Feb. 12, 2003 and claims the benefit thereof for priority purposes.

FIELD OF THE INVENTION

The invention relates to permanent magnet electric motors and more particularly, to a flux path of the motor in the form of a coil spring structure to hold the permanent magnets with respect to a frame.

BACKGROUND OF THE INVENTION

Conventional permanent magnet electric motors include a steel frame carrying permanent magnets and an iron flux ring disposed about the frame or magnets. This structure includes large cylindrical surfaces that typically resonate unwanted noise. Typically, the magnets are bonded or clipped to a steel structure which results in increased assembly costs, additional parts, and added scrap.

Accordingly, there is a need to provide a low-cost frame and flux path structure that holds the permanent magnets, has a reduced parts count, and results in a lower natural frequency to reduce noise.

SUMMARY OF THE INVENTION

An object of the invention is to fulfill the need referred to above. In accordance with the principles of the present invention, this objective is obtained by providing an electric motor having an armature including windings, the armature being constructed and arranged to rotate a shaft; a commutator; brushes to engage the commutator and conduct electrical current to the windings; permanent magnet structure disposed about the armature; a frame assembly carrying the permanent magnet structure; and a coil spring structure, containing iron, disposed about at least a portion of the permanent magnet structure contacting the permanent magnet structure to define a flux path of the motor.

In accordance with another aspect of the invention, a flux path structure is provided for an electric motor, the motor having a frame and permanent magnet structure. The flux path structure includes a coil spring structure containing iron and disposed about and contacting the permanent magnet structure to define a flux path of the motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE
EXEMPLARY EMBODIMENT

Figure 1:
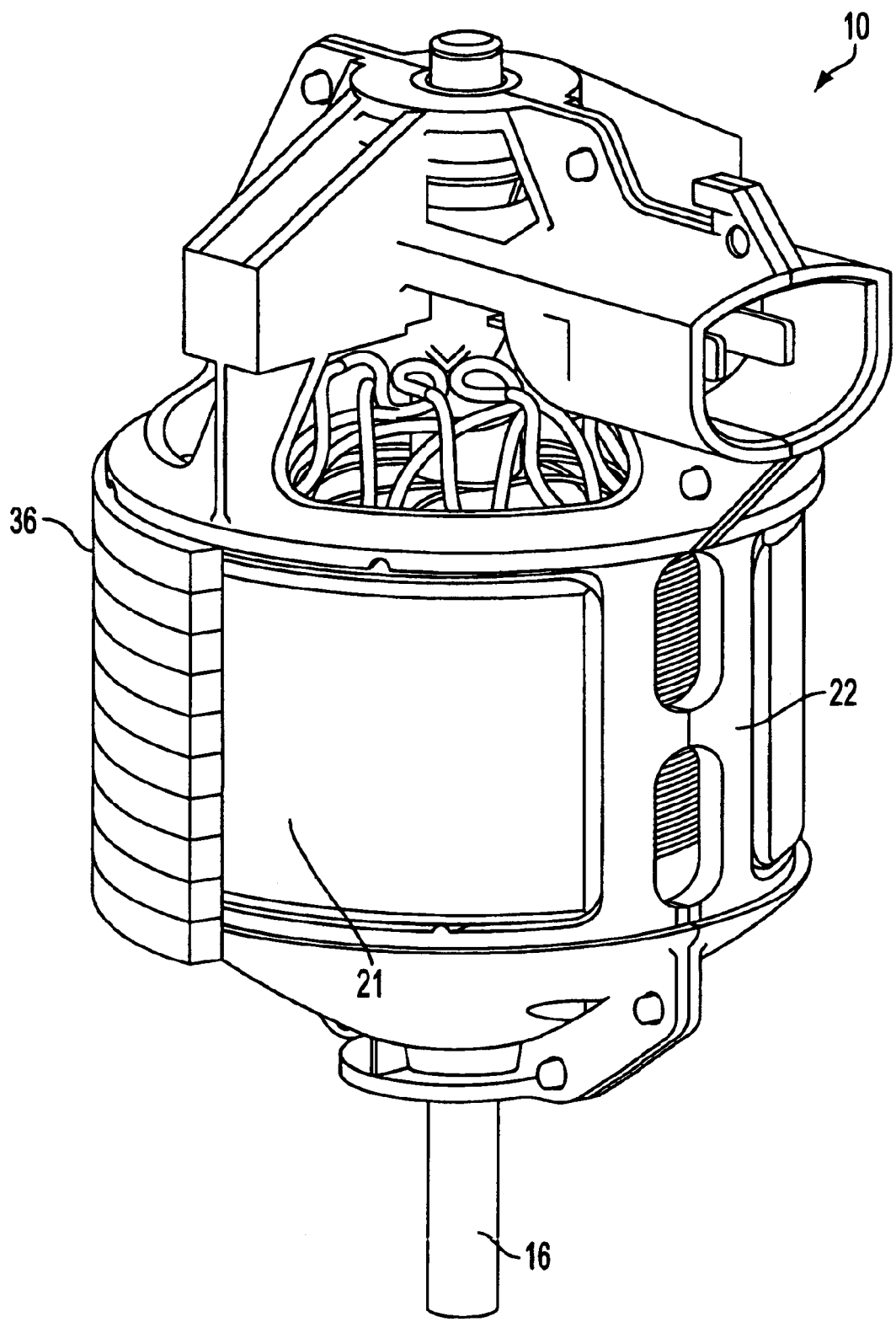
FIG. 1 is a perspective view of a permanent magnet electric motor, provided in accordance with the principles of the invention, and shown with a portion of the flux path structure removed for clarity of illustration.
Figure 2:
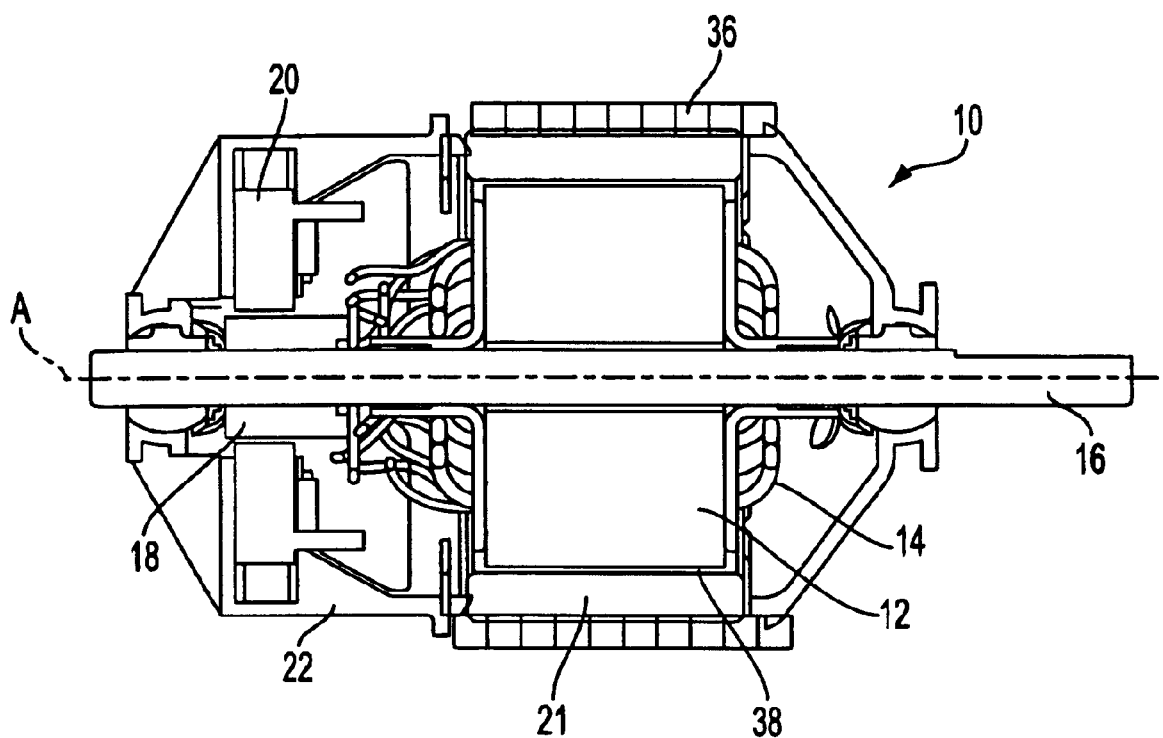
FIG. 2 is a cross-sectional view of the motor of FIG. 1.
Figure 3:
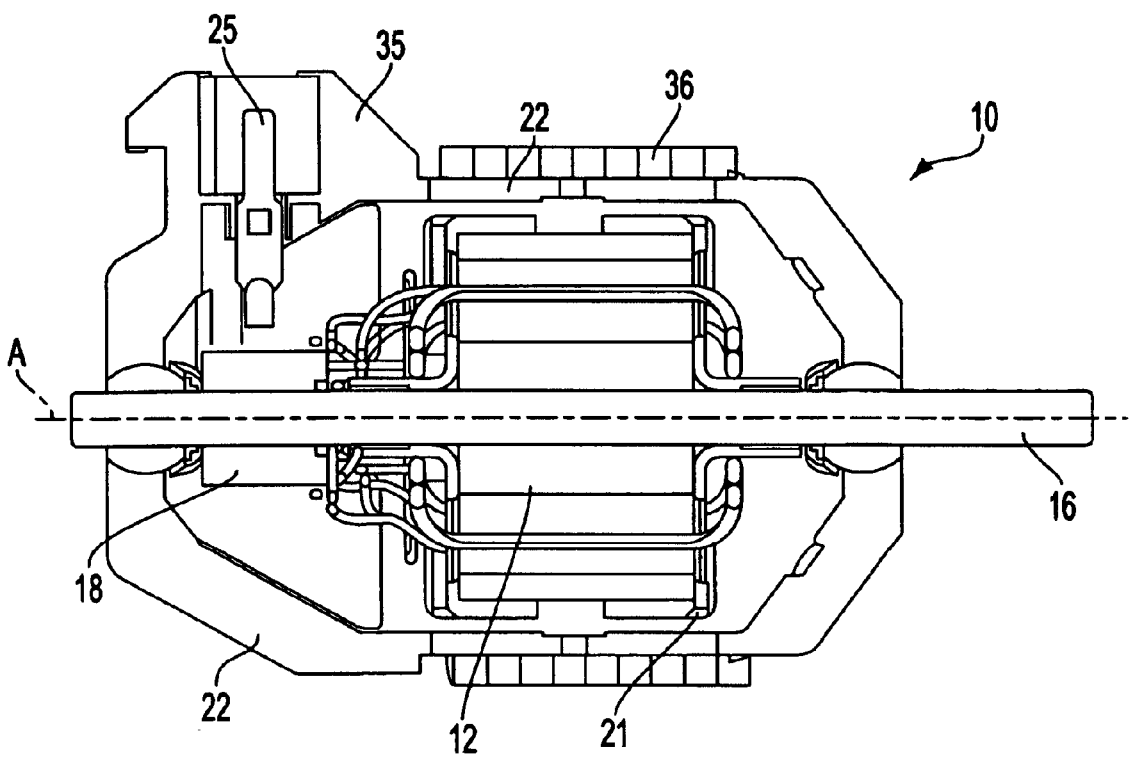
FIG. 3 is another cross-sectional view of the motor of FIG. 1, taken along a plane different from that of FIG. 2.

With reference to FIGS. 1–3, a permanent magnet electric motor is shown generally indicated at 10. The motor 10 is preferably configured for use in vehicle HVAC systems. The electric motor 10 includes an armature 12 having windings 14. The armature 12 is constructed and arranged to rotate a shaft 16. An axis of rotation of the shaft 16 of the motor is shown at A. The motor 10 includes a commutator 18 and brushes 20 to engage the commutator 18 and conduct electrical current to the windings 14. Permanent magnets 21 are disposed about the armature 12. A frame assembly 22 carries the permanent magnets 21.

Figure 4:
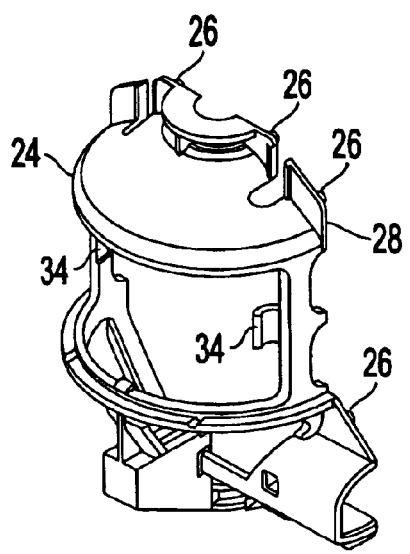
FIG. 4 is a perspective view of a first half of the frame assembly of the motor of FIG. 1.
Figure 5:
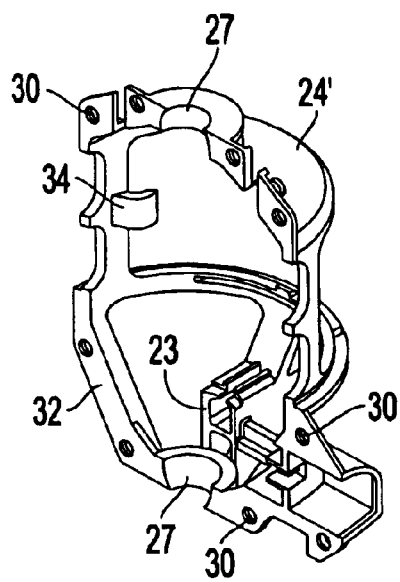
FIG. 5 is a perspective view of a second half of the frame assembly of the motor of FIG. 1.
Figure 6:
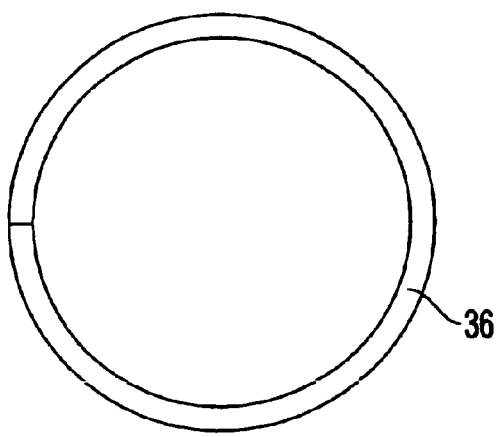
FIG. 6 is a plan view of a spring structure of the motor of FIG. 1 defining a flux path.
Figure 7:
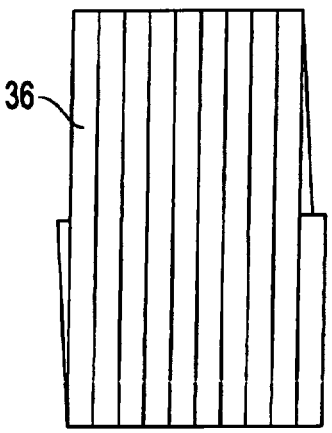
FIG. 7 is a side view of the spring structure of FIG. 6.

As shown in FIGS. 3 and 4, the frame assembly 22, preferably molded from plastic or other non-magnetic material, is of clam-shell configuration having a first half 24 (FIG. 3) and a mating second half 24' (FIG. 4). The plastic material for the frame assembly is preferably glass-filled NYLON®. The first half 24 includes a plurality of protrusions 26 extending from an edge 28 thereof and the second half 24' includes a plurality of recess 30 in edge 32. Each recess 30 receives an associated protrusion 26. Thus, once assembled, edges 28 and 32 are in abutting relation with the frame assembly 22 defining a generally open cylindrical structure. The frame assembly 22 includes a plurality of retaining tabs 34 for locating and retaining the permanent magnets 21 with respect to the inside of the frame assembly 22. An electrical connector body 35 is also molded into the frame assembly for housing an electrical connector 25 of the motor 10. Brush tubes 23 are defined in the frame assembly to hold brushes 20 so that no brush card is required. The frame assembly 22 incorporates the brush tubes 23, an end cap 25, bearing retainers 27 and the electrical connector body 35 (FIG.2).

As best shown in FIGS. 1 and 2, a coil spring structure 36 is provided about the outer periphery of a portion of the frame assembly 22 and thus permanent magnets 21 to define a flux path. In the embodiment, the spring structure 36 is preferably 3/16" rectangular rod, hot rolled steel. Since tolerances are not required to be tight, spring steel is an inexpensive material for the flux path. The spring structure 36 is constructed and arranged to contact the permanent magnets 21 to define a flux path of the motor. As used herein, the term "contact" can be direct contact or indirect contact through a ferrous material. In the embodiment, a spring load is exerted by the spring structure 36 toward the axis of rotation A to clamp the permanent magnets 21 to the frame assembly 22. In this embodiment, the spring structure also functions to retain the permanent magnets 21 with respect to the frame assembly 22. More particularly, the spring structure 36 is uncoiled and placed over at least a portion of the frame assembly 22 and is then released to trap or clamp the permanent magnets 21 against the frame assembly 22. It can be appreciated that the spring load may be exerted in directions other than towards the axis of rotation A.

The spring structure 36 provides a path of magnetic flux while retaining low scrap producing steel manufacturing methods, and has the ability to conform and engage in a loosely toleranced magnet assembly. The spring structure 36 clamps the magnets 21 to the frame assembly 22 preventing movement of the magnets 21 while maintaining a minimal air gap 38 (FIG. 2) in the magnetic circuit. With this structure no boding of the magnets is required. The spring structure 36 eliminates the conventional large cylindrical surfaces that typically resonate noise and replaces these surfaces with a structure of lower natural frequency. The length and the diameter of the coil spring structure 36 can be changed easily to accommodate different magnet saturation levels and applications. It can be appreciated that the coil spring structure main function is to provide a flux path (e.g., with no air gap between the spring structure and the permanent magnets).

In the broadest aspect of the invention, the non-magnetic frame assembly can be configured for carrying the magnets only and steel endcaps could be used at each end of the motor so long as the spring structure defines the flux path. In addition, it is contemplated that the coil spring structure can be used with any non-magnetic motor frame with the magnets disposed outside of the frame with the coil spring structure defining the flux path.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the followings claims.

What is claimed is:

1. An electric motor comprising:
   an armature having windings, the armature being constructed and arranged to rotate a shaft,
   a commutator,
   brushes to engage the commutator and conduct electrical current to the windings,
   permanent magnet structure disposed about the armature,
   a frame assembly carrying the permanent magnet structure, and
   a coil spring structure containing iron and disposed about at least a portion of the permanent magnet structure and contacting the permanent magnet structure to define a flux path for the motor.

2. The motor of claim 1, wherein the frame assembly is composed of first and second halves, composed of non-magnetic material, joined together.

3. The motor of claim 2, wherein the first half of the frame assembly includes a plurality of protrusions extending from an edge thereof and the second half of the frame assembly includes a plurality of recesses in an edge thereof such that each recess receives an associated protrusion so that the edges are in generally abutting relation.

4. The motor of claim 2, wherein the frame assembly defines brush tubes for holding the brushes, an end cap defining an end of the motor, a electrical connector body, and bearing retainers to retain bearings that support the shaft.

5. The motor of claim 1, wherein the frame assembly includes retaining tabs constructed and arranged to locate and retain the permanent magnet structure with respect to a portion of the frame assembly.

6. The motor of claim 1, wherein the coil spring structure is composed of rectangular rod steel.

7. The motor of claim 1, wherein the coil spring structure is constructed and arranged to exert a spring load to retain the permanent magnets with respect to the frame assembly.

8. A flux path structure for an electric motor, the motor having a frame and permanent magnet structure, the flux path structure comprising a coil spring structure containing iron and disposed about and contacting the permanent magnet structure.

9. The flux path structure of claim 8, wherein the coil spring structure is constructed and arranged to exert a spring load to retain the permanent magnet structure with respect to the frame.

10. The flux path structure of claim 8, wherein the coil spring structure is composed of rectangular rod steel.

11. An electric motor comprising:
    an armature having windings, the armature being constructed and arranged to rotate a shaft,
    a commutator,
    brushes to engage the commutator and conduct electrical current to the windings,
    permanent magnet structure disposed about the armature,
    a frame assembly carrying the permanent magnet structure, and
    means, containing iron and disposed about at least a portion of the permanent magnet structure to define a flux path of the motor, for exerting a spring load to clamp the permanent magnet structure with respect to the frame assembly.

12. The motor of claim 11, wherein the frame assembly is composed of first and second halves, composed of non-magnetic material, joined together.

13. The motor of claim 12, wherein the first half of the frame assembly includes a plurality of protrusions extending from an edge thereof and the second half of the frame assembly includes a plurality of recesses in an edge thereof such that each recess receives an associated protrusion so that the edges are in generally abutting relation.

14. The motor of claim 12, wherein the frame assembly includes retaining tabs constructed and arranged to locate and retain the permanent magnet structure with respect to an inside portion of the frame assembly.

15. The motor of claim 11, wherein the means for exerting a spring load includes a coil spring structure.

16. The motor of claim 15, wherein the coil spring structure is constructed and arranged to exert the spring load towards an axis of rotation of a shaft of the motor.

17. A method of providing a flux path of a permanent magnet electric motor, the motor having a frame carrying a permanent magnet structure, the method including the steps of:
    providing a coil spring structure containing iron,
    uncoiling the coil spring structure and placing the coil spring structure over the at least a portion of a periphery of the permanent magnet structure, and
    releasing the coil spring structure so as to contact the permanent magnet structure to define a flux path for the motor.

* * * * *